United States Patent
Andrade

(10) Patent No.: US 7,259,573 B2
(45) Date of Patent: Aug. 21, 2007

(54) SURFACE CAPACITANCE SENSOR SYSTEM USING BURIED STIMULUS ELECTRODE

(75) Inventor: Thomas L. Andrade, Los Gatos, CA (US)

(73) Assignee: Atrua Technologies, Inc., Campbell, CA (US)

( * ) Notice: Subject to any disclaimer, the term of this patent is extended or adjusted under 35 U.S.C. 154(b) by 0 days.

(21) Appl. No.: 10/155,793

(22) Filed: May 22, 2002

(65) Prior Publication Data

US 2003/0020495 A1 Jan. 30, 2003

Related U.S. Application Data

(60) Provisional application No. 60/292,858, filed on May 22, 2001.

(51) Int. Cl.
*G01R 27/26* (2006.01)
*G06K 9/00* (2006.01)

(52) U.S. Cl. .................................. 324/678; 382/124

(58) Field of Classification Search ................. 324/658, 324/662, 663, 686, 719, 124
See application file for complete search history.

(56) References Cited

U.S. PATENT DOCUMENTS

| | | | |
|---|---|---|---|
| 4,210,899 A | 7/1980 | Swonger et al. | 340/146.3 E |
| 4,353,056 A * | 10/1982 | Tsikos | 382/124 |
| 4,429,413 A | 1/1984 | Edwards | 382/4 |
| 4,435,056 A | 3/1984 | Tanikawa | 354/21 |
| 4,526,043 A | 7/1985 | Boie et al. | 73/862.04 |
| 4,577,345 A | 3/1986 | Abramov | 382/4 |
| 4,785,338 A | 11/1988 | Kinoshita et al. | 357/30 |
| 5,051,802 A | 9/1991 | Prost et al. | 357/30 |
| 5,166,679 A | 11/1992 | Vranish et al. | |
| 5,195,145 A | 3/1993 | Backus et al. | 382/4 |
| 5,207,102 A | 5/1993 | Takahashi et al. | 73/727 |
| 5,214,388 A | 5/1993 | Vranish et al. | |
| 5,264,393 A | 11/1993 | Tamura et al. | 437/209 |
| 5,325,442 A * | 6/1994 | Knapp | 382/124 |
| 5,373,245 A * | 12/1994 | Vranish | 324/662 |
| 5,382,310 A | 1/1995 | Ozimek et al. | 156/275.5 |

(Continued)

FOREIGN PATENT DOCUMENTS

EP 0 929 050 A2 7/1999

(Continued)

OTHER PUBLICATIONS

Veridicom, Inc., "FPS110, FPS110B, FPS110E Solid State Fingerprint Sensor," Document #02-0053-01, Revision F, Jan. 26, 2001, pp. 1-17.

(Continued)

*Primary Examiner*—Anjan Deb
*Assistant Examiner*—Jeff Natalini
(74) *Attorney, Agent, or Firm*—Perkins Coie LLP

(57) ABSTRACT

A surface capacitance sensor system is implemented as an array of sensor electrodes near the surface of the integrated circuit and an array of stimulus electrodes below the sensor electrodes. Rows of stimulus electrodes are driven by sources while the voltages at the respective sensor electrodes are measured. Voltage measurements at each sensor electrode allow the surface capacitance at each sensor electrode location to be determined. The capacitance data is used to determine the positions of target electrodes above the array surface as required in the location fingerprint artifacts.

17 Claims, 5 Drawing Sheets

U.S. PATENT DOCUMENTS

| | | | |
|---|---|---|---|
| 5,424,249 A | 6/1995 | Ishibashi | 437/211 |
| 5,429,006 A | 7/1995 | Tamori | 73/863.046 |
| 5,434,446 A | 7/1995 | Hilton et al. | 257/503 |
| 5,442,347 A | 8/1995 | Vranish | |
| 5,485,011 A | 1/1996 | Lee et al. | 250/338.1 |
| 5,539,292 A | 7/1996 | Vranish | |
| 5,559,504 A | 9/1996 | Itsumi et al. | 340/825.3 |
| 5,559,961 A | 9/1996 | Blonder | |
| 5,576,763 A | 11/1996 | Ackland et al. | |
| 5,577,120 A | 11/1996 | Penzias | |
| 5,602,585 A | 2/1997 | Dickinson et al. | |
| 5,622,873 A | 4/1997 | Kim et al. | 438/65 |
| 5,625,304 A | 4/1997 | Azadet et al. | |
| 5,631,704 A | 5/1997 | Dickinson et al. | |
| 5,668,874 A | 9/1997 | Kristol et al. | |
| 5,673,123 A | 9/1997 | Dickinson | |
| 5,739,562 A | 4/1998 | Ackland et al. | |
| 5,748,448 A | 5/1998 | Hokari | 361/749 |
| 5,764,789 A | 6/1998 | Pare, Jr. et al. | |
| 5,778,089 A | 7/1998 | Borza | 382/124 |
| 5,805,422 A | 9/1998 | Otake et al. | 361/749 |
| 5,822,030 A | 10/1998 | Uchiyama | 349/149 |
| 5,824,950 A | 10/1998 | Mosley et al. | 174/52.4 |
| 5,825,907 A | 10/1998 | Russo | |
| 5,828,773 A | 10/1998 | Setlak et al. | 382/126 |
| 5,835,141 A | 11/1998 | Ackland et al. | |
| 5,844,486 A | 12/1998 | Kithil et al. | |
| 5,862,248 A | 1/1999 | Salatino et al. | 382/124 |
| 5,864,296 A | 1/1999 | Upton | |
| 5,867,368 A | 2/1999 | Glenn | 361/783 |
| 5,869,791 A * | 2/1999 | Young | 178/20.01 |
| 5,901,046 A | 5/1999 | Ohta et al. | 361/760 |
| 5,903,225 A | 5/1999 | Schmitt et al. | |
| 5,920,640 A | 7/1999 | Salatino et al. | |
| 5,940,526 A | 8/1999 | Setlak et al. | |
| 5,963,679 A * | 10/1999 | Setlak | 382/312 |
| 5,978,496 A | 11/1999 | Harkin | 382/124 |
| 5,987,156 A | 11/1999 | Ackland et al. | |
| 5,991,408 A | 11/1999 | Pearson et al. | |
| 6,011,859 A | 1/2000 | Kalnitsky et al. | 382/124 |
| 6,016,355 A | 1/2000 | Dickinson et al. | 382/124 |
| 6,028,773 A | 2/2000 | Hundt | 361/760 |
| 6,049,620 A * | 4/2000 | Dickinson et al. | 382/124 |
| 6,055,324 A * | 4/2000 | Fujieda | 382/124 |
| 6,061,464 A | 5/2000 | Leger | 382/124 |
| 6,069,970 A | 5/2000 | Salatino et al. | |
| 6,097,195 A | 8/2000 | Ackland et al. | 324/719 |
| 6,114,862 A | 9/2000 | Tartagni et al. | 324/662 |
| 6,130,448 A | 10/2000 | Bauer et al. | |
| 6,191,593 B1 * | 2/2001 | Tartagni et al. | 324/687 |
| 6,192,142 B1 | 2/2001 | Pare, Jr. et al. | |
| 6,195,447 B1 | 2/2001 | Ross | |
| 6,208,264 B1 | 3/2001 | Bradney et al. | |
| 6,211,936 B1 | 4/2001 | Nakamura | 349/152 |
| 6,214,634 B1 | 4/2001 | Osajda et al. | 438/50 |
| 6,246,566 B1 | 6/2001 | Glenn | 361/220 |
| 6,259,804 B1 | 7/2001 | Setlak et al. | |
| 6,260,300 B1 | 7/2001 | Klebes et al. | |
| 6,268,231 B1 | 7/2001 | Wetzel | 438/48 |
| 6,289,114 B1 * | 9/2001 | Mainguet | 382/124 |
| 6,317,508 B1 | 11/2001 | Kramer et al. | 382/124 |
| 6,320,394 B1 | 11/2001 | Tartagni | |
| 6,330,345 B1 | 12/2001 | Russo et al. | |
| 6,342,406 B1 | 1/2002 | Glenn et al. | |
| 6,362,633 B1 | 3/2002 | Tartagni | |
| 6,365,888 B2 | 4/2002 | Von Basse et al. | 250/208.1 |
| 6,396,116 B1 | 5/2002 | Kelly et al. | 257/432 |
| 6,437,583 B1 | 8/2002 | Tartagni et al. | |
| 6,438,257 B1 * | 8/2002 | Morimura et al. | 382/124 |
| 6,459,804 B2 | 10/2002 | Mainguet | |
| 6,483,931 B2 | 11/2002 | Kalnitsky et al. | |
| 6,496,021 B2 | 12/2002 | Tartagni et al. | |
| 6,501,846 B1 | 12/2002 | Dickinson et al. | |
| 6,515,269 B1 | 2/2003 | Webster et al. | |
| 6,518,560 B1 | 2/2003 | Yeh et al. | |
| 6,535,622 B1 | 3/2003 | Russo et al. | |
| 6,538,456 B1 | 3/2003 | Dickinson et al. | |
| 6,546,122 B1 | 4/2003 | Russo | |
| 6,583,632 B2 | 6/2003 | Von Basse et al. | |
| 6,657,323 B2 * | 12/2003 | Muller | 307/116 |
| 2001/0017548 A1 | 8/2001 | Basse et al. | 324/678 |
| 2002/0180464 A1 | 12/2002 | Tartagni | |

FOREIGN PATENT DOCUMENTS

JP        11253426        9/1999

OTHER PUBLICATIONS

Atmel Inc., "Thermal Fingerprint Sensor with 0.4 mm × 14 mm (0.02"×0.55") Sensing Area and Digital Output (On-chip ADC), FCD4B14 FingerChip™," Revision1962C, Jan. 2002, pp. 1-20.

Infineon Technologies Inc., "Microsystems for Biometrics, FingerTIP™, FTF 1100 MF1 V2.0, CMOS Chip and System", Data Book 3.3, May 2000, pp. 1-38.

* cited by examiner

SURFACE CAPACITANCE SENSOR SYSTEM USING BURIED STIMULUS ELECTRODE

CROSS REFERENCE TO RELATED APPLICATIONS

This application claims the benefit of priority to U.S. Provisional Patent Application Serial No. 60/292,858 filed on May 22, 2001, which is hereby incorporated by reference.

FIELD OF THE INVENTION

The present invention relates to improvements in capacitance sensor systems as are suitable to be fabricated with integrated circuit technology for use in sensors and sensing arrays that measure the position of fingerprint artifacts or other structures near the sensor surface.

BACKGROUND

Depending on the physical structure, the capacitance between a target electrode and a sense electrode varies inversely proportional to their relative distance, inversely proportional to their relative distance squared, or some functional dependence between inverse and inverse quadratic depending on the nature of the physical structure. The maximum distance at which a capacitance sensor system can detect target conductors in the vicinity of its sensor area is dependent on the minimum capacitance the system can resolve. If the capacitance of the sensor electrode relative to its ambient environment, its reference capacitance, is large compared to the capacitance between the target electrode and the sensor electrode, the capacitance sensor system sensitivity is significantly degraded. The size of the sensor electrode is dictated by the size of fingerprint artifacts, which is typically about the size of a 100 micrometer square. Being part of an integrated circuit whose vertical dimensions are small compared to 100 micrometers, the sensor electrode itself has significant capacitance to the substrate on which it mechanically rests.

For use in measuring the positions of fingerprint artifacts, a sensor array composed of an array of sensor electrodes was disclosed by Knapp in U.S. Pat. No. 5,325,442. Each sense electrode is connected through a passive switch to array wiring that is the length of the array. The array wiring is connected to a charge sensing circuit to determine the capacitance. The capacitance sensitivity is degraded by the array wiring as the effective reference capacitance on each sensor electrode increased. Additionally, semiconductor switches are introduced into the sensor area where they may be damaged by mechanical contact with the target electrode, or may leak due to photocurrent when the sensor is operated in a high-light-level environment. Additional coatings may be applied to the sensor surface to reduce the sensor's susceptibility to damage, but at an increase in the sensor to target electrode distance.

In U.S. Pat. No. 6,049,620, Dickinson et al. disclose a technique to measure the capacitance at each sensor electrode using a low value current source and additional active circuitry. A signal proportional to the total sensor capacitance is switched onto the array wiring after being passed through a source follower thereby isolating the wiring capacitance from the sensor electrode. With this technique the reference capacitance value is dominated by the sensor electrode capacitance and the capacitance of the circuitry connected to the sensor electrode itself.

In U.S. Pat. No. 6,097,195, Ackland et al. disclose a method to reduce the sensor electrode capacitance by introducing a shield electrode between the sensor electrode and the grounded physical support structure. This reference capacitance cancellation technique is applied individually to each sensor electrode, resulting in a significant reduction in the reference capacitance and a proportional increase in the sensor capacitance sensitivity. A unity gain amplifier is connected between the sensor electrode and the shield electrode with one amplifier used per sensor electrode. The increase in sensor complexity increases the sensor cost and the risk of damage from the target structures.

Other capacitive sensor systems have been described which add circuitry to the sensor array as well as additional sensor electrodes. In U.S. Pat. No. 6,114,862, Tartagni et al. disclose a capacitance sensor with active circuitry and special electrode configurations designed to improve the capacitive sensor sensitivity. The capacitance sensor use two electrodes at the sensor surface connected to opposite ends of an amplifier. Target structures such as fingers near either electrode modify the capacitance between electrodes. Both electrodes occupy the sensor surface, which increases the sensor cell size and cost.

RELEVANT LITERATURE
U.S. Patent Documents

| U.S. Pat. No. | Date | Inventor | U.S. Class |
| --- | --- | --- | --- |
| 4,210,899 | July 1980 | Swonger, et al. | 340/146.3 E |
| 4,435,056 | October 1982 | Tsikos | 340/146.3 E |
| 4,429,413 | January 1984 | Edwards | 382/4 |
| 4,526,043 | July 1985 | Boie, et al. | 73/862.04 |
| 5,195145 | March 1993 | Backus, et al. | 382/4 |
| 5,325,442 | June 1994 | Knapp | 382/4 |
| 5,434,446 | July 1995 | Hilton, et al. | 257/503 |
| 5,778,089 | July 1998 | Borza | 382/124 |
| 5,828,773 | October 1998 | Setlak, et al. | 382/126 |
| 5,978,496 | November 1999 | Harkin | 382/124 |
| 6,049,620 | November 2000 | Dickinson, et al. | 382/124 |
| 6,055,324 | April 2000 | Fujieda | 382/124 |
| 6,061,464 | May 2000 | Leger | 382/124 |
| 6,097,195 | August 2000 | Ackland, et al. | 324/719 |
| 6,114,862 | September 2000 | Tartagni, et al. | 324/662 |
| 6,289,114 | September 2001 | Mainguet | 324/124 |
| 6,317,508 | November 2001 | Kramer, et al. | 382/124 |
| 6,365,888 | April 2002 | Von Basse, et al. | 250/208.1 |

SUMMARY

The present invention provides a capacitance sensor system that overcomes the shortcomings of known technology as described above. The present invention eliminates the need for reference capacitance cancellation circuitry while reducing the sensor's power consumption and increasing its mechanical robustness.

In this invention each sensor cell has one electrode at or near the surface of the integrated circuit. Physically below the surface electrode is a buried stimulus electrode. The drive capacitance is the capacitance between the stimulus electrode and the sensor electrode. The capacitance from the sensor electrode to ground is the sensed capacitance. For an input time-varying voltage applied to the sense electrode, a measurement of the time-varying output voltage at the sense electrode is used to determine the sensed capacitance relative to the drive capacitance. This series arrangement of capacitors forms a capacitive voltage divider.

If there are no structures proximate to the sensor electrode, the sense capacitance value is the reference value. Target structures, such as fingerprint artifacts, that are proximate to the sense electrode increase the sense capacitance by adding a target capacitance to the reference capacitance. The increased capacitance reduces the time-varying output voltage at the sense electrode, which in turn identifies the target structure's proximity.

An array of sensors cells is able to identify the location of target structures above each element of the array as required for the location of fingerprint artifacts. To implement an n×m dimensional array, the number of sources and voltmeters is reduced from one pair per cell using an appropriate switching matrix. An arrangement of n rows with n sources and m columns with m voltmeters provides a suitable tradeoff in circuit power, circuit complexity, and overall capacitance measurement rate. The array of electrodes, switches, time-varying sources, time-varying voltmeters and ancillary circuits are combined in the same integrated circuit to form the capacitance sensor system.

In a sensor array, the time-varying voltmeter is shared by all sensor elements in the same column and the time-varying voltage source is shared by all sensor elements in the same row. The time-varying input voltage source and time-varying voltmeter are implemented in CMOS technology. Cost reductions result from reductions in sensor circuit size as well as the use of CMOS technology that has not been modified for sensor applications. Mechanical robustness and resistance to optically induced currents are increased in the invention by removing all MOS transistor components from the sensor electrode area.

BRIEF DESCRIPTION OF THE DRAWINGS

For a more thorough understanding of the features and advantages of the capacitive sensor, reference is now made to the detailed description of the invention in which.

The figures are merely schematic and have not been drawn to any consistent scale. The same reference numbers are used throughout to represent the same or similar elements.

DETAILED DESCRIPTION OF EMBODIMENTS OF THE INVENTION

Figure 1:
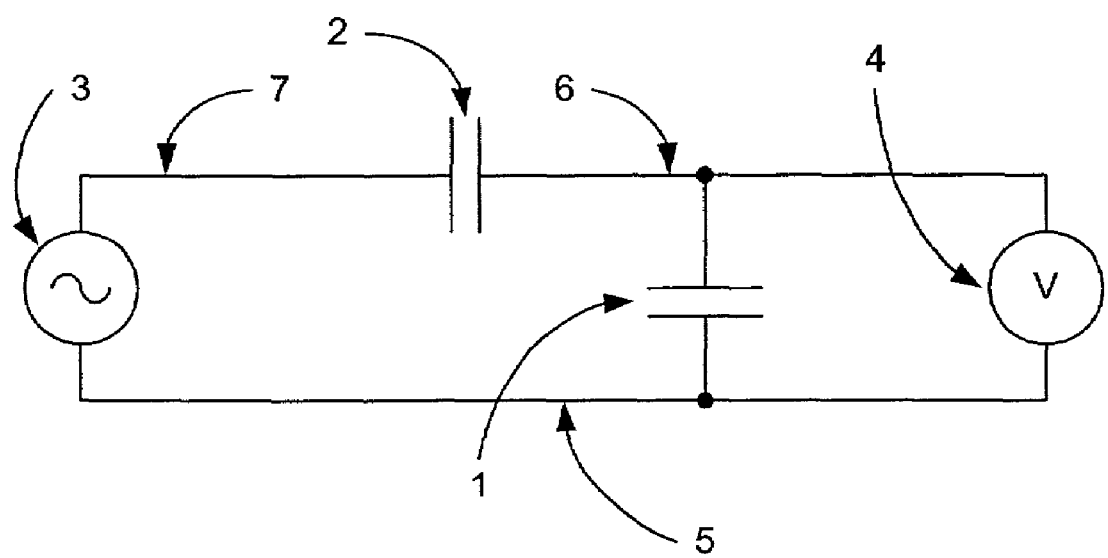
FIG. 1 illustrates an embodiment of the capacitive divider elements.

FIG. 1 illustrates an embodiment of an elementary method for measuring the value of an unknown capacitance (1). For convenience of illustration, the sense capacitance (1) is shown with one connection to the reference potential (5). The connection (5) represents the reference potential for the time-varying voltage source (3) and for the time-varying voltmeter (4). The capacitance value, c1, of sense capacitor (1) may be determined relative to the drive capacitance value, c2 of drive capacitor (2) by connecting the capacitors as shown. Node (6) is a common node between the voltmeter (4) and the two capacitors, (1) and (2). For a known time-varying voltage v3 from the time-varying voltage source (3), the unknown capacitance (1) is determined by the simple formula c1 equals the product of c2 and the calculated quantity (v3−v4)/v4, in which v4 is the voltage measured by the time-varying voltmeter (4).

Figure 2:
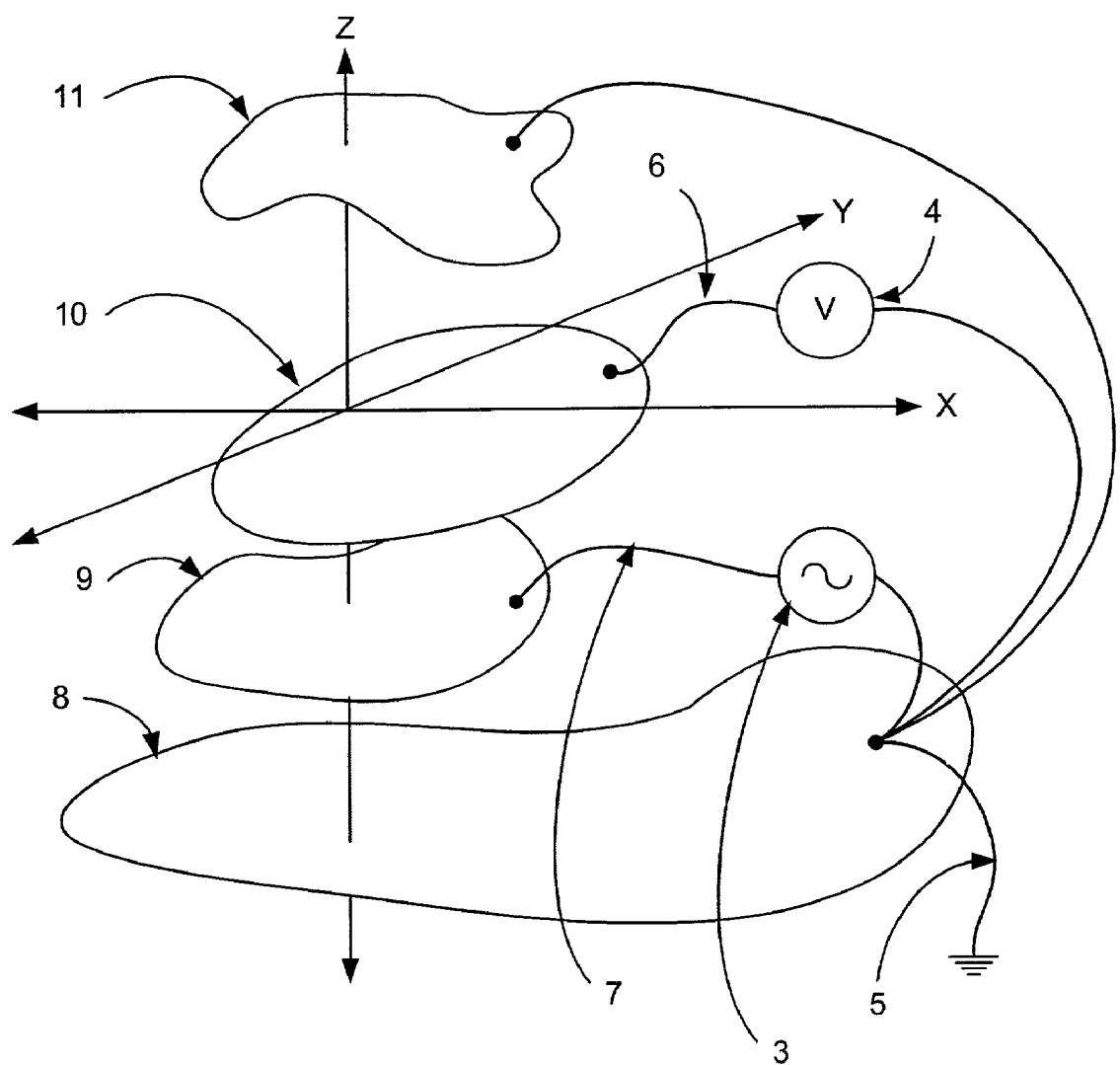
FIG. 2 is an embodiment of a single sensor cell showing the stimulus, sense, reference and target electrodes.

A physical implementation of the capacitive divider of FIG. 1 is illustrated in FIG. 2. The reference capacitance of value c3 is the capacitance between the sense electrode (10) and the reference electrode (8). The target capacitance of value c4 is the electrical capacitance between the sense electrode (10) and the target electrode (11). Sense capacitance value c2 is the sum of c3 and c4. The drive capacitor (2) of value c2 is the capacitance between the stimulus electrode (9) and the sense electrode (10). The time-varying voltage source (3) is connected between the drive electrode (9) and the reference electrode (8), which is shown connected to ground potential (5) without loss of generality. The target electrode (11) is also at the ground potential.

The physical arrangement shown in FIG. 2 is implemented as an integrated circuit capacitance sensor system with all electrodes except the target electrode (11) being planar and stacked nearly one on the other. The target electrode (11) is the unknown shaped electrode above the sense electrode (10). The sense electrode (10), node (6) of FIG. 1, serves as part of both drive and sense capacitors, (1) and (2). Both the time-varying voltage source (3) and the time-varying voltmeter (4) may be shared between multiple capacitance measuring sensor cells.

Figure 3:
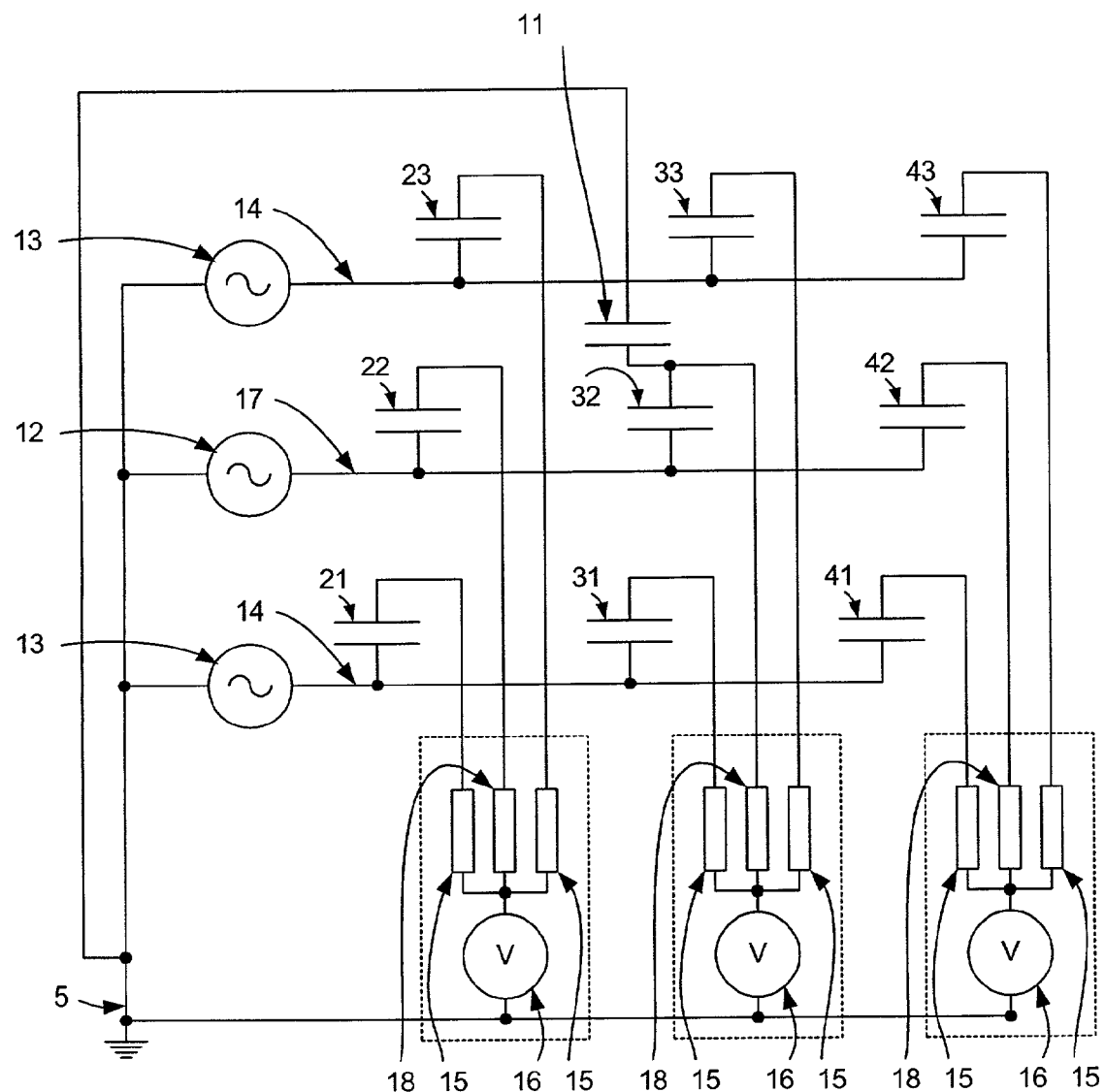
FIG. 3 is a schematic representation of an embodiment of the capacitive sensor illustrating a representative portion of the capacitive sensor system.

FIG. 3 shows a portion of the electrical schematic of embodiment of the invention. Nine identical sense electrodes in a 3×3 array are shown, (21), (22), (23), (31), (32), (33), (41), (42), and (43). Of course other and different sized arrays (larger and smaller) may be used. These sense electrodes are part of both the drive and the sense capacitors. The other terminal of the drive capacitor is the stimulus electrode. While the stimulus electrodes beneath the sensor electrodes are physically unique, all stimulus electrodes in the same row are electrically connected. Common nodes (14) and (17) are driven by sources, (13) and (12) respectively. To save power, only one source is active during capacitance measurement of a particular row of sensor cells. In FIG. 3 source (12) is active, driving node (17) with a time-varying voltage, while sources (13) are inactive or otherwise statically driven.

FIG. 3 shows nine switches, (15) and (18), added to the portion of the sensor array. Each switch, (15) and (18), is connected to a wire oriented perpendicular to the direction of the commonly driven stimulus electrodes, (14) and (17). When node (17) is driven by a source (13), the switches (18) connected to sense electrodes (22), (32), and (42) are closed. All other switches (15) are open. The voltmeters (16) are connected to only one sensor electrode each. This perpendicular arrangement of drive nodes and voltmeter connections allows for a simultaneous measurement of the sensor capacitance along a row of sensor electrodes.

For the case of a common node (17) driven by source (12) and the sources (13) with fixed potential, three switches are closed (18) and six switches (15) are open. Sense electrodes (22), (32), and (42) are connected to their respective voltmeters (16). For the case of one target electrode (11) over sense electrode (32), the voltage on the voltmeter (16) connected to electrode (32) is lower than the voltage on the other voltmeters (16) connected to either sense electrodes (22) or (42). In this way both the presence of a target electrode at sense electrode (32) is detectable as well as a measurement of the capacitance between electrodes (11) and (32), and hence information about the distance between electrodes (11) and (32).

Figure 4:
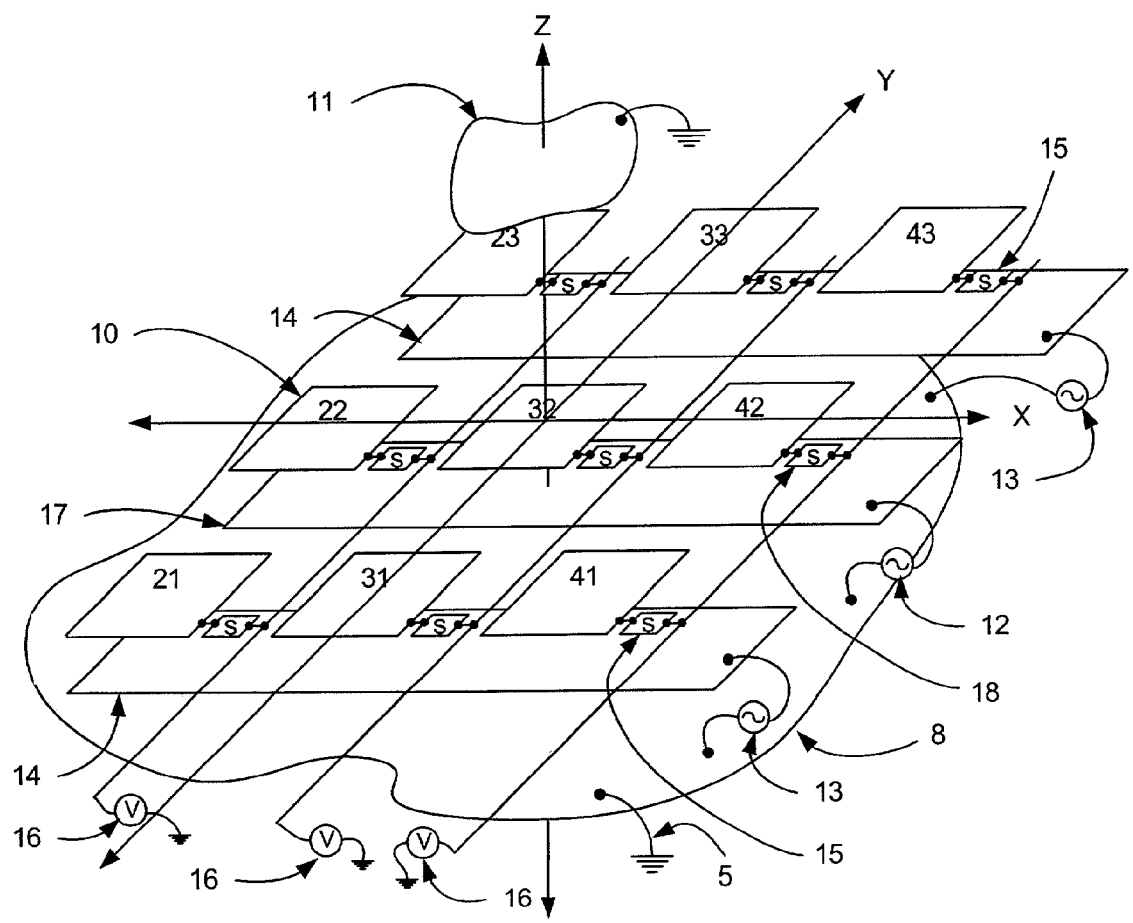
FIG. 4 is an embodiment of a portion of a capacitive sensor system using individual row-stimulus, time-varying sources; and shared-column, time-varying voltmeters corresponding to the schematic representation of FIG. 3.

FIG. 4 shows the embodiment of the invention corresponding to the schematic of FIG. 3. The switches (15) and (18) are shown physically within the sensor electrode array area. Each switch is shown physically adjacent to a corresponding sensor electrode. All switches in the same column are connected to one voltmeter (16). Multiple target electrodes (11) or the complex shape of a single target electrode (11) are deduced by sequentially measuring all the sense capacitance values.

Figure 5:
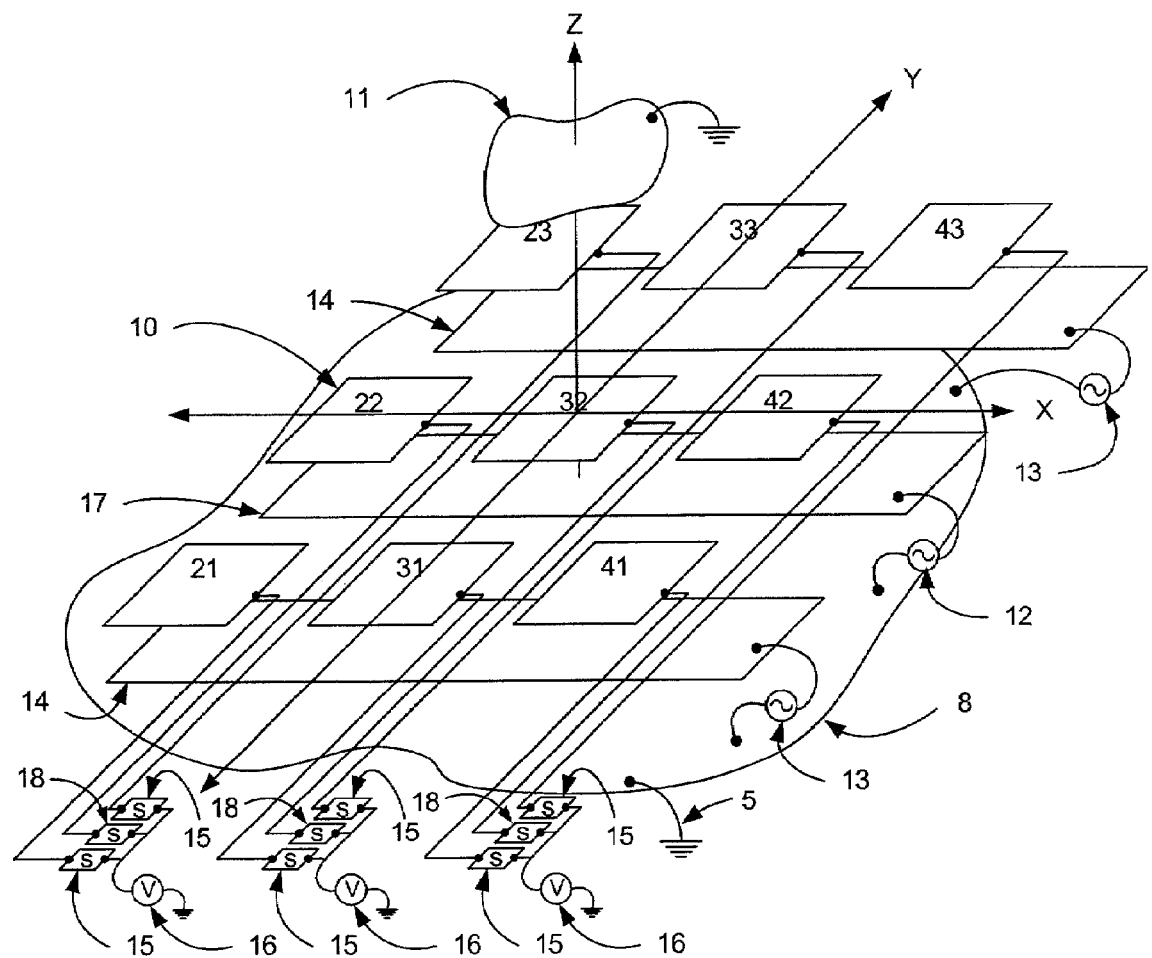
FIG. 5 is another embodiment of a portion of a capacitive sensor system using individual row-stimulus, time-varying sources; and shared-column, time-varying voltmeters corresponding to the schematic representation of FIG. 3 in which the column switch matrix is external to the sensor array.

FIG. 5 shows another embodiment of the invention. All the switches, and hence all transistor devices, are located external to the sensor electrode array area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A capacitance sensor device comprising:
   an integrated circuit;
   a sensor electrode array comprising n rows and m columns;
   a plurality of stimulus electrodes wherein each stimulus electrode corresponds to a row of said sensor electrode array, each of said plurality of stimulus electrod6s located beneath at least one sensor electrode in said sensor electrode array;.
   a plurality of n time-varying voltage sources, wherein each voltage source is connected to a stimulus electrode;
   a plurality of m time-varying voltmeters;
   a plurality of m blocks of n switches that allows the connection of one of the n sensor electrodes along a column to one time-varying voltmeter; wherein
   at least one sensor electrode is operable to diminish a capacitance between at least one of the plurality of stimulus electrodes located beneath the at least one sensor electrode and an element sensed by the capacitance sensor device.

2. The capacitance sensor device in claim 1, wherein no MOS devices within the integrated circuit are beneath or between any sensor or stimulus electrodes.

3. A capacitance sensor device for sensing an external object, comprising:
   a plurality of sensor electrodes;
   a stimulus electrode positioned such that there is a capacitance between the stimulus electrode and at least one of the plurality of sensor electrodes, said stimulus electrode beneath at least one of said plurality of sensor electrodes;
   a time-varying voltage source connected to the stimulus electrode;
   a plurality of time-varying voltmeters;
   a plurality of switches, wherein each switch is coupled to the sensor electrode and one of the plurality of time-varying voltmeters; wherein
   said stimulus electrode is further positioned such that a capacitance between said at least one of said plurality of sensor electrodes said external object is greater than a capacitance between said stimulus electrode and said external object.

4. The capacitance sensor device in claim 3, wherein the device further includes MOS devices and no MOS devices are beneath or between any sensor or stimulus electrodes.

5. A capacitance sensor device according to claim 3, wherein the stimulus electrode is beneath at least one sensor electrode.

6. A capacitance sensor device according to claim 3, further comprising:
   a plurality of stimulus electrodes, each stimulus electrode being associated with a plurality of sensor electrodes.

7. A capacitance sensor device according to claim 6 wherein said stimulus electrode is associated with a plurality of sensor electrodes in that said stimulus electrode is capacitively coupled to a plurality of sensor electrodes.

8. A capacitance sensor device according to claim 3, wherein the sensor electrode arranged in an array having a plurality of rows and columns.

9. A capacitance sensor device for sensing a target structure, comprising:
   a first plurality of sense electrodes;
   at least one stimulus electrode capacitively coupled to said plurality of sense electrodes, said at least one stimulus electrode located beneath at least one of said first plurality of sense electrodes, the at least one of said first plurality of sense electrodes adapted to diminish a capacitance between the target structure and the at least one stimulus electrode;
   a voltage source coupled to the stimulus electrode adapted to generte a drive voltage between the stimulus electrode and at least one of the first plurality of sense electrodes;
   a plurality of switches, each switch coupled to a different one of the first plurality of sense electrodes; and
   a voltmeter coupled to the plurality of switches and adapted to measure a sensed voltage at a selected one of the first plurality of sense electrodes.

10. A capacitance sensor device according to claim 9, wherein said switches are adapted to select said selected one of the first plurality of sense electrodes.

11. A capacitance sensor device according to claim 9, wherein each of said switches comprises at least one transistor and none of said transistors are beneath or between any of said sense electrodes or said stimulus electrode.

12. A capacitance sensor device according to claim 9, wherein said voltage source comprises at least one transistor and none of said transistors are beneath or between any of said sense electrodes or said stimulus electrode.

13. A capacitance sensor device according to claim 9, wherein each of said voltmeters comprises at least one transistor and none of said transistors are beneath or between any of said sense electrodes or said stimulus electrode.

14. A capacitance sensor device according to claim 9, wherein said stimulus electrode is beneath said plurality of sense electrodes.

15. A capacitance sensor device according to claim 14 wherein the second plurality of switches are adapted to select the selected one of the second plurality of sense electrodes.

16. A capacitance sensor device according to claim 9, further comprising:
  a second plurality of sense electrodes;
  a second stimulus electrode capacitively coupled to said second plurality of sense electrodes;
  a second voltage source coupled to the second stimulus electrode and adapted to generate a drive voltage between the second stimulus electrode end at least one of the second plurality of sense electrodes;
  a second plurality of switches, each coupled to a different one of the second plurality of sense electrodes;
  a second voltmeter coupled to the second plurality of switches, the second voltmeter adapted to measure a sensed voltage at a selected one of the second plurality of sense electrodes.

17. A method for sensing a target structure comprises at least a portion of a fingertip the method comprising:
  capacitively coupling at least one stimulus electrode to a plurality of sense electrodes located beneath said at least one sense electrode, at least one of said plurality of sense electrodes adapted to diminish a capacitance between the target structure and the at least one stimulus electrode;
  applying time-varying voltages to said at least one stimulus electrodes to generate a drive voltage between the at least one stimulus electrode and at least one of the plurality of sense electrodes;
  coupling a voltmeter to a selected one of the plurality of sense electrodes through a plurality of switches, each switch coupled to a different one of the plurality of sense electrodes;
  measuring a time varying voltage at the at least one sense electrode;
  determining the capacitance between the at least one sense electrode and the target structure using an integrated circuit comprising MOS devices wherein no MOS devices are located beneath or between the plurality of sense electrodes and the at least one stimulus electrodes; and
  at least partially shielding the at least one stimulus electrode from capacitively coupling to the target structure by means of the sense electrodes.

* * * * *